G. G. MILNE.
CAR LIGHTING GENERATOR DRIVE MECHANISM.
APPLICATION FILED JULY 3, 1918.
1,369,291. Patented Feb. 22, 1921.
2 SHEETS—SHEET 1.
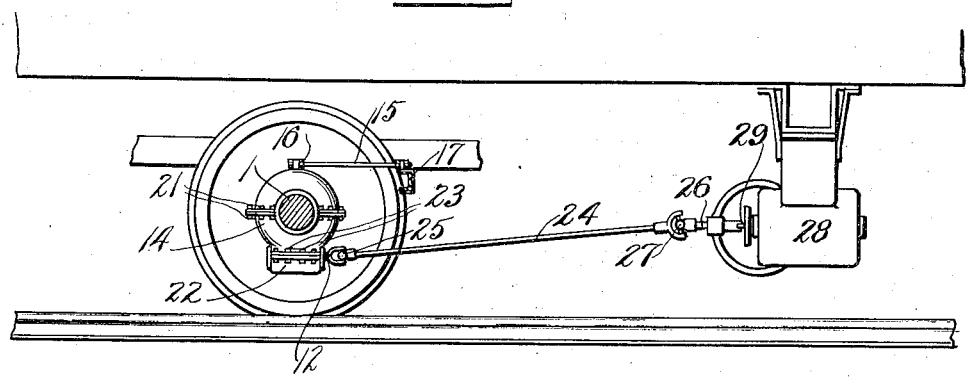
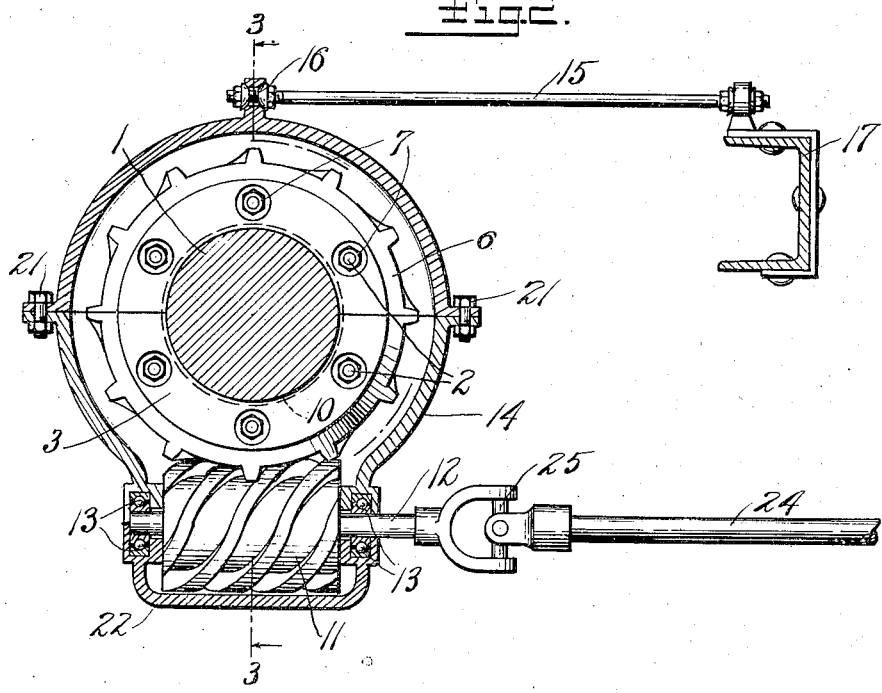
George G. Milne, Inventor
By his Attorneys Kenyon & Kenyon

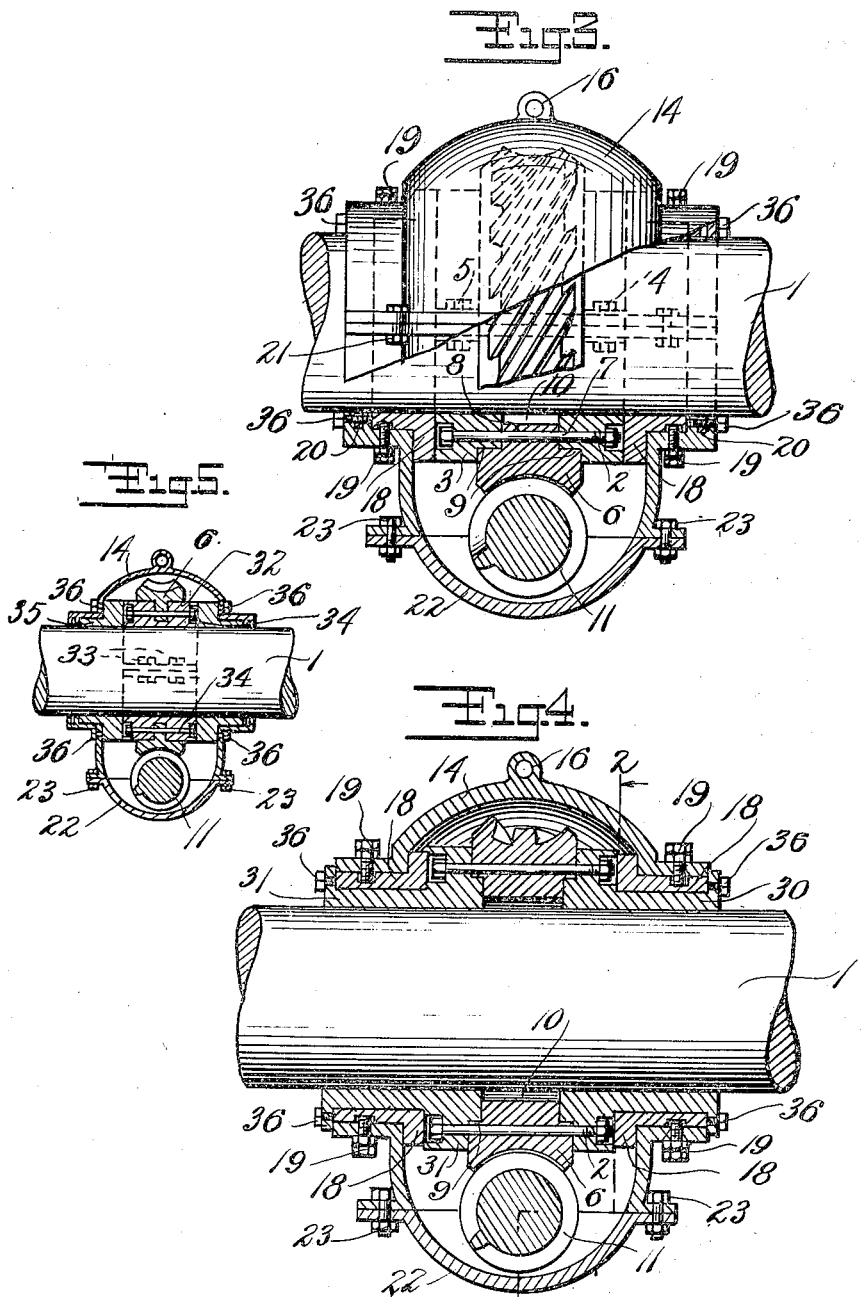

UNITED STATES PATENT OFFICE.

GEORGE G. MILNE, OF RYE, NEW YORK, ASSIGNOR TO THE HUMIL CORPORATION, A CORPORATION OF NEW YORK.

CAR-LIGHTING GENERATOR-DRIVE MECHANISM.

1,369,291.  Specification of Letters Patent.  Patented Feb. 22, 1921.

Application filed July 3, 1918. Serial No. 243,109.

*To all whom it may concern:*

Be it known that I, GEORGE G. MILNE, a citizen of the United States, and a resident of Rye, county of Westchester, and State of New York, have invented certain new and useful Improvements in Car-Lighting Generator-Drive Mechanism, of which the following is a specification.

My invention relates to the axle train lighting art and is particularly directed to the driving of the generator for such lighting equipments.

It is an object of my invention to simplify the driving arrangement and to eliminate as much as possible all elements which tend to cause disruption of surface and trouble and annoyances of various kinds. My invention is particularly directed to the form of drive in which a worm gear is used.

One embodiment of my invention is shown in the accompanying drawings forming a part of this specification and in which—

Figure 1 is a side view of the parts applied to the train axle.

Fig. 2 is an enlarged sectional view of the drive and part of the axle end of the driving apparatus.

Fig. 3 shows another view partly in section, the same being taken at right angles to Fig. 2.

Figs. 4 and 5 show similar cross sections of modified structures according to my invention.

Referring to the drawings, the car axle 1 is provided with split collars 2 and 3. These collars are clamped on the shaft by means of bolts 4 and 5. Fastened between the collars 2 and 3 is a split worm gear 6. This gear is held between the collars by means of bolts 7 which pass through the collars 2 and 3 and through an inwardly projecting flange 8 of the gear. The collars are provided with circular depressions in which shoulders 9 of the worm gear 6 fit. The shoulders 9 on the gear are turned through and so are the depressions in the collars 2 and 3 so that when the parts are assembled on the axle the worm gear 6 is properly centered around the axis of the axle. Between the flange 8 of the gear and the axle is a space 10. It has been found that it frequently happens that on heavy steel cars the axles break at their mathematical centers. The likelihood of this breaking is increased if the axles are in any way scored or marked at or very near their mathematical center. One of the advantages of the present arrangement, therefore, is that the parts are kept out of touch with the mathematical center and in fact, the axle is strengthened by means of the collars 2 and 3 and the gear 6 and the bolts 7 which hold the parts together. The split collars and the worm gear being tightly clamped around the axle, of course rotate with it.

There is a worm 11 which coöperates with the worm gear 6 and is rotated by the gear 6. The worm 11 is mounted on a shaft 12 having ball-bearings 13 located in a casing 14 surrounding all the parts. The casing 14 is held in position by a rod 15 fastened in the upper part of the casing in a ball and socket joint 16 and also fastened to a cross-beam 17 of the car.

Inside the casing are bearings 18, one at each end. These bearings are arranged to snugly engage the axle and also the casing. The bearings are held in proper alinement with the casing by means of set-screws or bolts 19. The outer portion of the casing likewise fits snugly around the axle and is provided with an anti-friction strip 20 in the usual way. The casing is split and the parts are held together by means of the bolts 21. The lower part of the casing which incloses the worm 11 is provided with a detachable part 22 held in place by the bolts 23 and upon the removal of which, access may be gained to the worm 11.

The shaft 12 is connected with shaft 24 through a universal joint 25. The shaft 24 in turn is connected with a shaft 26 through a universal joint 27, which shaft 26 drives the armature of a generator 28. Between the shaft 26 and the armature of the generator 28 is a slidable connection 29 to permit of relative longitudinal movement of the parts.

From the foregoing description the operation of the apparatus will be evident and need not be described in detail, but briefly, the axle acts as the driving force and acting through the worm gear 6, worm 11 and shaft 24 drives the armature of the generator 28. The speed ratio between these various parts may be modified in accordance with the required conditions.

The arrangement previously described is particularly applicable to axles which have a comparatively smooth surface for coöperation with the bearings 18. It frequently happens that the axle is not suitable for this bearing surface without being machined or otherwise turned. This machining or turning will ordinarily not be permitted by the railroad authorities for the reason that it tends to weaken the axle and thereby many other disadvantages arise. I have overcome this difficulty by means of the invention as illustrated in Fig. 4. This structure may be identical with that previously described with the exception that the collars 30 and 31 extend outwardly to a point beyond the edge of the casing 14. These collars are clamped around the axle in exactly the same manner as in Fig. 3 but the outer side of these collars is suitably machined to form a good bearing surface, the same being properly centered around the axis of the shaft. The bearings 18 are placed upon these collars and are held in alinement with the casing by means of the bolts 19 as in Fig. 3. It will be seen that all of the parts of the device of Fig. 4 are substantially the same as in Fig. 3 with the exception of the collars 30 and 31.

By means of this arrangement I am enabled to place upon an axle which has a rough outer surface a good and true bearing surface for the attachment of the driving apparatus. The operation of the arrangement shown in Fig. 4 is exactly the same as that previously described.

A still further modification is shown in Fig. 5. In this figure there is only one collar 32. This collar 32 is split and is attached directly to the shaft 1 by means of bolts 33. The drive gear 6 is attached to the collar 32 by being placed in a groove therein. Bolts 34 pass through the block and also through the web on the gear 6 so as to securely hold the same in place. Placed adjacent the collar 32 is a bearing 35 having a surface in contact with the collar and also a surface in contact with the axle. Attached to and surrounding the bearings 35 is the casing 14 and in mesh with the gear 6 is the worm 11. In the casing 14, in each modification, is a bolt 36 which passes through the casing and engages the bearings 35 so that the same may be adjusted with relation to the collar 32 to compensate for wear.

It will be noted that the bearings between the casing and the collars in all of the modifications above described have a relatively large bearing surface. This is of advantage because of the heavy thrust existing between these parts during the operation of the mechanism. The arrangement of two bearing surfaces substantially at right angles within the casing is peculiarly adapted to meet this large strain in a very simple and effective way.

Many other slight changes may be made in carrying out my invention without in any way departing from the spirit thereof and such modifications or changes are contemplated by me and come within the scope of my invention as defined in the following claims.

Having fully described my invention, what I claim as new and desire to secure by Letters Patent is:

1. In a device of the character described, the combination of an integral railway car axle, two collars on said axle, a drive gear between said collars and adapted to rotate with said axle, bearings on said axle, a casing for said parts and a driven gear meshing with said drive gear.

2. In a device of the character described, the combination of an integral railway car axle, two split collars around said axle, a drive gear between said collars and held therebetween to rotate with the axle, a bearing for each collar, a casing for said parts, a drive gear in said casing driven by said drive gear and a shaft driven by said drive gear.

3. In a device of the character described, the combination of a car axle, two split members on said axle and adapted to rotate therewith, a drive gear held between said split members and caused by friction to rotate with said axle, two bearings one for each of said split members, a gear driven by said drive gear, a casing for said parts and means holding said casing and bearings against rotation with said shaft.

4. In a device of the character described, the combination of a car axle, two split collars clamped on said axle to rotate therewith, a drive gear carried by said collars out of engagement with said axle, a gear driven by said drive gear, a casing for said parts, bearings between said casing and axle and means preventing said casing revolving with said axle.

5. In a device of the character described, the combination of an integral car axle, two split collars on said shaft one on each side of the exact center of the shaft, a drive gear between said collars and out of engagement with said axle, a gear driven by said drive gear, a casing for said parts and bearings between said casing and axle.

6. In a device of the character described, the combination of a car axle, two split collars on said axle and adapted to rotate therewith, a drive gear mounted between said collars out of engagement with said axle and held between the collars by friction bearings in engagement with said collars and shaft, a gear driven from said drive gear, a casing for said parts holding said bearings in place and means for holding said casing against rotation with said shaft.

7. In a device of the character described, the combination of an integral car axle, two split collars mounted positively to rotate with said axle, means holding the parts of said collars together, a drive gear, means for holding said gear between said collars, bearings for said collars, a casing for said parts supported by said bearings, a worm in said casing meshing with said drive gear, a shaft driven by said worm and means for holding said casing from rotation with said axle.

8. In a device of the character described, the combination of an integral car axle, two split members thereon, each provided with a smooth outer bearing surface, a drive gear carried by said members and adapted to rotate with said axle, a casing for said parts and having bearing surfaces engaging with the bearing surfaces on said split members, a gear driven by said drive gear and a shaft driven by said driven gear.

9. In a device of the character described, the combination of a car axle, a split collar thereon, a drive gear mounted on said collar and rotated therewith, a casing for said collar and gear, a bearing between said casing and collar, a worm in said casing meshing with said drive gear, a shaft driven by said worm and means for holding said casing against rotation.

10. In a device of the character described, the combination of a car axle, a split collar thereon, a drive gear mounted on said collar and rotated therewith, a casing for said collar and gear, a bearing between said casing and collar, means for adjusting said bearing relatively to said collar, a worm in said casing meshing with said drive gear, a shaft driven by said worm and means for holding said casing against rotation.

11. In a device of the character described, the combination of a car axle, a collar on said axle, a drive gear attached to said collar, a casing for said gear and collar, a bearing between said collar casing and collar having a proportionately large bearing surface, and means for adjusting the bearing relatively to said collar to compensate for wear.

In testimony whereof I have signed my name to this specification.

GEORGE G. MILNE.